US012613553B2

(12) United States Patent
Xia

(10) Patent No.: US 12,613,553 B2
(45) Date of Patent: Apr. 28, 2026

(54) FLEXIBLE DISPLAY DEVICE AND ELECTRONIC EQUIPMENT

(71) Applicant: Shenzhen China Star Optoelectronics Semiconductor Display Technology Co., Ltd., Shenzhen (CN)

(72) Inventor: Rong Xia, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 1005 days.

(21) Appl. No.: 17/764,566

(22) PCT Filed: Mar. 15, 2022

(86) PCT No.: PCT/CN2022/080948
§ 371 (c)(1),
(2) Date: Aug. 31, 2023

(87) PCT Pub. No.: WO2023/159694
PCT Pub. Date: Aug. 31, 2023

(65) Prior Publication Data
US 2024/0069600 A1 Feb. 29, 2024

(30) Foreign Application Priority Data
Feb. 23, 2022 (CN) .......................... 202210166414.6

(51) Int. Cl.
*G06F 1/16* (2006.01)
(52) U.S. Cl.
CPC .......... *G06F 1/1652* (2013.01); *G06F 1/1681* (2013.01)

(58) Field of Classification Search
CPC ....... G06F 1/1652; G06F 1/1681; G06F 9/301
See application file for complete search history.

(56) References Cited

U.S. PATENT DOCUMENTS

| | | | |
|---|---|---|---|
| 11,950,379 B2 * | 4/2024 | Kim .................... | H04M 1/0216 |
| 2006/0107566 A1 * | 5/2006 | Van Rens ............. | G06F 1/1652 |
| | | | 40/515 |

(Continued)

FOREIGN PATENT DOCUMENTS

| | | | |
|---|---|---|---|
| CN | 205264275 U | * | 5/2016 |
| CN | 106205396 | | 12/2016 |

(Continued)

OTHER PUBLICATIONS

International Search Report and the Written Opinion Dated Nov. 24, 2022 From the International Searching Authority Re. Application No. PCT/CN2022/080948 and Its Translation Into English. (15 Pages).

*Primary Examiner* — Abhishek M Rathod

(57) ABSTRACT
A flexible display device and an electronic equipment are provided in the present application. The flexible display device provided by the embodiment of the present application includes a flexible display module and a support module. The support module includes an adjustment member. The adjustment member has a first stiffness and a second stiffness. When the flexible display module is in a bent state, the adjustment member is in a first state and curled. When the flexible display module is in a flattened state, the adjustment member is in a second stiffness and flattened. Wherein, the first stiffness is less than the second stiffness.

19 Claims, 4 Drawing Sheets

(56) References Cited

U.S. PATENT DOCUMENTS

| | | | | |
|---|---|---|---|---|
| 2011/0193829 | A1* | 8/2011 | Tsai | G09F 9/30 |
| | | | | 345/204 |
| 2017/0156220 | A1* | 6/2017 | Heo | H05K 1/028 |
| 2019/0098774 | A1* | 3/2019 | Park | H05K 5/0217 |
| 2020/0154580 | A1 | 5/2020 | Shin et al. | |
| 2022/0078934 | A1* | 3/2022 | Lee | H10K 59/871 |
| 2022/0147107 | A1* | 5/2022 | Wang | G06F 1/1637 |
| 2022/0343807 | A1* | 10/2022 | Lee | G09F 9/301 |

FOREIGN PATENT DOCUMENTS

| | | | | | |
|---|---|---|---|---|---|
| CN | 106254589 | A | * | 12/2016 | H04M 1/026 |
| CN | 108269496 | | | 7/2018 | |
| CN | 113299190 | | | 8/2021 | |
| CN | 113362713 | | | 9/2021 | |
| CN | 113950655 | A | * | 1/2022 | B60K 35/00 |
| CN | 105118401 | | | 5/2022 | |
| WO | 2021/129641 | | | 7/2021 | |
| WO | WO 2021/238930 | | | 12/2021 | |

* cited by examiner

100

1023
1024
102
1021
1022
104
101

1021b
1021c
1021
1021d
1021a 1012
1011 101

100

1021

1023

101

104

FLEXIBLE DISPLAY DEVICE AND ELECTRONIC EQUIPMENT

RELATED APPLICATIONS

This application is a National Phase of PCT Patent Application No. PCT/CN2022/080948 having International filing date of Mar. 15, 2022, which claims the benefit of priority of Chinese Patent Application No. 202210166414.6 filed on Feb. 23, 2022. The contents of the above applications are all incorporated by reference as if fully set forth herein in their entirety.

FIELD AND BACKGROUND OF THE INVENTION

The present application relates to a field of display technology, in particular to a flexible display device and an electronic equipment.

In recent years, more and more attention has been paid to flexible technology, and the requirements for flexible substrates flexibility are getting higher and higher. During research and practice of prior art, inventors of the present application found that if a flexible display module is to be curled and flattened after being unfolded, it is necessary to apply force to both sides of a screen. A solution is generally realized by adding additional hinge structures and lifting rods. Alternatively, one end of the flexible display module is rotated by a motor, and another end is kept flat by a tension spring. These solutions not only increase a thickness of a whole machine, but also makes a mechanism extremely complex and expensive.

SUMMARY OF THE INVENTION

The present application provides a flexible display device and an electronic equipment, which can simplify a structure and reduce costs of the flexible display device.

The present application provides a flexible display device, including:

a flexible display module having a bent state and a flattened state;

a support module disposed below the flexible display module, and the support module including an adjustment member;

wherein when the flexible display module is in the bent state, the adjustment member is to curl and the adjustment member has a first stiffness; when the flexible display module is in the flattened state, the adjustment member is to flatten, and the adjustment member has a second stiffness; and the first stiffness is less than the second stiffness.

Optionally, in some embodiments of the present application, the adjustment member is a solid-liquid conversion regulator or a gas regulator.

Optionally, in some embodiments of the present application, the solid-liquid conversion regulator includes a containment structure and a solid-liquid conversion material, and the solid-liquid conversion material is accommodated in the containment structure; when the flexible display module is in the bent state, the solid-liquid conversion material is liquid, and when the flexible display module is in the flattened state, the solid-liquid conversion material is solid.

Optionally, in some embodiments of the present application, the gas regulator is an airbag, when the flexible display module is in the bent state, the airbag is in a shrinking state, and when the flexible display module is in the flattened state, the airbag is in an expanded state.

Optionally, in some embodiments of the present application, the airbag is strip-shaped, and the airbag is arranged along a bending direction of the flexible display module.

Optionally, in some embodiments of the present application, a quantity of the airbag is two, and two airbags are disposed on both sides of the flexible display module.

Optionally, in some embodiments of the present application, the flexible display device further includes an air pump, an air valve, and an air conduit, the air pump is disposed in the flexible display module, the air conduit connects the air pump and the airbag, and the air valve is disposed between the air conduit and the airbag for controlling an inflow and an outflow of gas.

Optionally, in some embodiments of the present application, the flexible display module includes a flexible display panel and a driving circuit board, the driving circuit board is disposed on a side of the flexible display panel, and the air pump is disposed on the driving circuit board.

Optionally, in some embodiments of the present application, the support module further includes a support film, the support film is disposed on the flexible display module, and the adjustment member is disposed on the support film.

Optionally, in some embodiments of the present application, a hollow pattern is defined in the support film.

Optionally, in some embodiments of the present application, the hollow pattern is a plurality of strip-shaped through holes arranged at intervals, and a width of anyone of the strip-shaped through holes ranges from 0.2 mm to 1 mm.

Optionally, in some embodiments of the present application, the support module further includes a hinge bearing film and a hinge, the hinge bearing film is disposed on a side of the adjustment member away from the flexible display module, and the hinge is disposed on a side of the hinge bearing film away from the flexible display module.

Correspondingly, an embodiment of the present application further provides an electronic equipment, including a flexible display device and a packaging structure, and the flexible display device including:

a flexible display module having a bent state and a flattened state; and a support module disposed below the flexible display module, and the support module including an adjustment member;

wherein when the flexible display module is in a bent state, the adjustment member is to curl, and the adjustment member has a first stiffness; when the flexible display module is in the flattened state, the adjustment member is to flatten, and the adjustment member has a second stiffness; and the first stiffness is less than the second stiffness; and the packaging structure is disposed on the flexible display device.

Optionally, in some embodiments of the present application, the adjustment member is a solid-liquid conversion regulator or a gas regulator.

Optionally, in some embodiments of the present application, the solid-liquid conversion regulator includes a containment structure and a solid-liquid conversion material, and the solid-liquid conversion material is accommodated in the containment structure; when the flexible display module is in the bent state, the solid-liquid conversion material is liquid, and when the flexible display module is in the flattened state, the solid-liquid conversion material is solid.

Optionally, in some embodiments of the present application, the gas regulator is an airbag, when the flexible display module is in the bent state, the airbag is in a shrinking state, and when the flexible display module is in the flattened state, the airbag is in an expanded state.

Optionally, in some embodiments of the present application, the airbag is strip-shaped, and the airbag is arranged along a bending direction of the flexible display module.

Optionally, in some embodiments of the present application, a quantity of the airbag is two, and two airbags are disposed on both sides of the flexible display module.

Optionally, in some embodiments of the present application, wherein the flexible display device further includes an air pump, an air valve, and an air conduit, the air pump is disposed in the flexible display module, the air conduit connects to the air pump and the airbag, and the air valve is disposed between the air conduit and the airbag, for controlling an inflow and an outflow of gas.

Optionally, in some embodiments of the present application, the flexible display module includes a flexible display panel and a driving circuit board, the driving circuit board is disposed on a side of the flexible display panel, and the air pump is disposed on the driving circuit board.

ADVANTAGEOUS EFFECTS

The embodiments of the present application disclose a flexible display device and an electronic equipment. The flexible display device provided by the embodiments of the present application includes the flexible display module and the support module. The flexible display module has a bent state and a flattened state. The support module is disposed on the flexible display module. The support module includes an adjustment member. The adjustment member has a first stiffness and a second stiffness. When the flexible display module is in the bent state, the adjustment member is in the first state and curled. When the flexible display module is in the flattened state, the adjustment member is in the second stiffness and flattened. Wherein, the first stiffness is less than the second stiffness. The adjustment member enables the flexible display module to maintain the flatness of the flexible display module without any external force, and does not affect the curling of the flexible display module. When the flexible display device is in the bent state and flattened state, the adjustment member has two states with different stiffness. Therefore, the design of many complicated rotating mechanisms and motors can be omitted, thereby simplifying the structure, and reducing the cost of the flexible display device.

BRIEF DESCRIPTION OF THE SEVERAL VIEWS OF THE DRAWINGS

In order to more clearly illustrate the embodiments or technical solutions of the existing art, the drawings illustrating the embodiments or the existing art will be briefly described below. Obviously, the drawings in the following description merely illustrate some embodiments of the present application. Other drawings may also be obtained by those skilled in the art according to these figures without paying creative work.

DESCRIPTION OF SPECIFIC EMBODIMENTS OF THE INVENTION

Figures 1, 2:
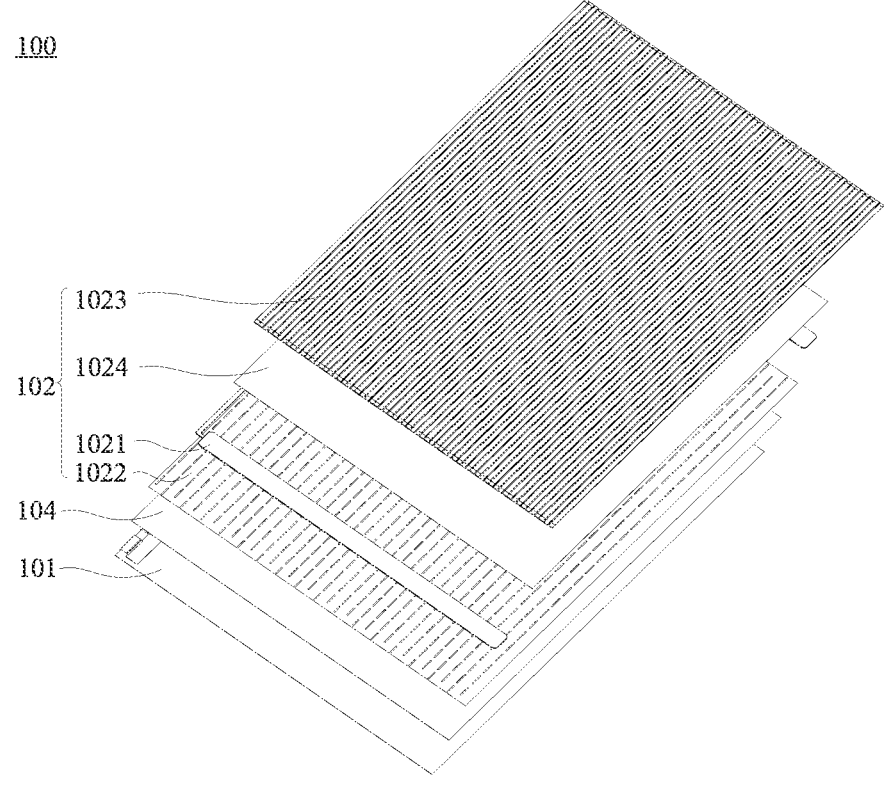
FIG. 1 is an exploded structural schematic diagram of a flexible display device provided by the present application.
FIG. 2 is a three-dimensional structure schematic diagram of a flexible display device provided by the present application.

In the following, the technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application. In addition, it can be understood that, the specific embodiments described herein are only used to illustrate and explain the present application, but not to limit the present application. In the present application, unless otherwise stated, the directional words used such as "upper" and "lower" generally refer to the upper and lower sides of the device in actual use or working state, specifically the drawing direction in the accompanying drawings; while "inside" and "outside" refer to the outline of the device.

An embodiment of the present application provides a flexible display device and an electronic equipment. Detailed descriptions are given below. It can be noted that, the order of description in the following embodiments is not meant to limit the preferred order of the embodiments.

Referring FIG. 1 and FIG. 2, FIG. 1 is an exploded schematic schematic diagram of a flexible display device provided by the present application. FIG. 2 is a three-dimensional structure schematic diagram of a flexible display device provided by the present application. The flexible display device provided by an embodiment of the present application includes a flexible display module 101 and a support module 102. The flexible display module 101 having a bent state and a flattened state. The support module 102 is disposed below the flexible display module 101. The support module 102 includes an adjustment member 1021. When the flexible display module 101 is in the bent state, the adjustment member 1021 is to curl and the adjustment member 1021 has a first stiffness. When the flexible display module 101 is in the flattened state, the adjustment member 1021 is to flatten and the adjustment member 1021 has a second stiffness. Wherein, the first stiffness is less than the second stiffness.

Wherein, the bent state of the flexible display module 101 refers to a state when the flexible display module 101 is rolled or bent. The flattened state of the flexible display module 101 refers to a state when the flexible display module 101 is displayed on a plane. A stiffness refers to an ability of a material or a structure to resist elastic deformation when subjected to force. It is a characterization of an ease of an elastic deformation of the material or the structure. In this embodiment of the present application, the stiffness refers to an ability of the adjustment member 1021 to resist elastic deformation when subjected to force.

It can be understood that, when the flexible display module 101 is in the bent state, the adjustment member 1021 has flexibility, and curls with the flexible display module 101. When the flexible display module 101 is in the flattened state, the stiffness of the adjustment member 1021 increases to support the flexible display module 101. In the drawings, the flexible display device 100 is shown upside down to clearly show an arrangement relationship between the adjustment member and the flexible display module 101.

It can be noted that, when the flexible display module 101 is in the bent state, the adjustment member 1021 has flexibility. That is, the first stiffness is small or close to zero, and the adjustment member 1021 is bent easily. When the flexible display module 101 is in the flattened state, the adjustment member 1021 has stiffness. That is, the second stiffness is relatively large or approaches infinity, and the adjustment member 1021 is bent not easily.

The flexible display device 100 provided by the embodiment of the present application includes the flexible display module 101 and the support module 102. The support module 102 includes the adjustment member 1021. The adjustment member 1021 enables the flexible display module 101 to maintain a flatness of the flexible display module 101 without any external force, and does not affect the curling of the flexible display module 101. When the flexible display device 100 is in the bent state and flattened state, the adjustment member 1021 also has two states with different stiffness. Therefore, a design of many complicated rotating mechanisms and motors can be omitted, thereby simplifying the structure and reducing cost of the flexible display device 100.

Optionally, the adjustment member 1021 is a solid-liquid conversion regulator or a gas regulator. When the adjustment member 1021 is the solid-liquid conversion regulator, the adjustment member includes a containment structure and a solid-liquid conversion material, and the solid-liquid conversion material is accommodated in the containment structure. When the flexible display module 101 is in the bent state, the solid-liquid conversion material is liquid, and when the flexible display module 101 is in the flattened state, the solid-liquid conversion material is solid. The solid-liquid conversion material can be converted from liquid to solid under certain conditions. For example, a magnetorheological fluid is contained within the containment structure. The magnetorheological fluid is a new type of fluid with controllable fluidity. It exhibits Newtonian fluid properties of low viscosity in the absence of an external magnetic field. It exhibits Bingham fluid of high viscosity and low fluidity in an external magnetic field. Generally speaking, when there is no external magnetic field, the magnetorheological fluid has rollability and can be bent with the bending of the flexible display module 101; When the external magnetic field is applied, the magnetorheological fluid has a supportability and can be used to support the flexible display module 101 in a flattened state.

Wherein, magnetic particles in the magnetorheological fluid can be surface-modified to improve compatibility and dispersibility of polar magnetic metals with non-polar carrier fluids. Surfactants and coupling agents are commonly used stabilizers. Alternatively, by adding nanoparticles or nanowires to the magnetorheological fluid, adjusting the composition and collocation of a dispersed phase of the magnetorheological fluid, and improving the microstructure of the magnetic chain under the action of magnetic field, so as to improve the magnetorheological effect.

Therefore, the magnetorheological effect of magnetorheological fluid can be adjusted to make the solid-liquid conversion regulator have better adjustability and meet support requirements of different flexible display device 100.

Specifically, by putting an electric field to the magnetorheological fluid through electrodes in the flexible display module 101. For example, using wires in the flexible display module 101 to form a potential difference, thereby forming a horizontal electric field, to change a state of the magnetorheological fluid. Alternatively, providing electrodes on both sides of the flexible display device 100, and forming a potential difference through the electrodes on both sides of the flexible display device to form a vertical electric field, so as to change the state of magnetorheological fluid.

Optionally, when the adjustment member 1021 is the gas regulator, the adjustment member 1021 includes an airbag 1021a. When the flexible display module 101 is in the bent state, the airbag 1021a is in a shrinking state, at and this time, the airbag 1021a has the first stiffness. When the flexible display module 101 is in the flattened state, the airbag 1021a is in an expanded state, at and this time, the airbag 1021a has the second stiffness.

It can be understood that, the components of the flexible display device 100 are not shown exploded in FIG. 2. Since the airbag 1021a is disposed inside the flexible display device 100, so the airbag 1021a is illustrated with a dotted line.

Optionally, the airbag 1021a is strip-shaped, and the airbag 1021a is arranged along a bending direction of the flexible display module 101. The airbag 1021a is arranged in the shape of a long-strip and is arranged along the bending direction of the flexible display module 101, so that the airbag 1021a can have better support in the flattened state of the flexible display module 101.

Specifically, a length of the airbag 1021a may be less than or equal to a length of the flexible display module 101. That is, the airbag 1021a can be as shown in FIG. 1 and FIG. 2, and a length of one piece can cover the flexible display module 101. Providing a long airbag 1021a can better simplify the device structure of the flexible display device 100 and reduce a thickness of the flexible display device 100.

Alternatively, the airbag 1021a may be in the shape of a shorter bar. A plurality of airbags 1021a are disposed on the flexible display module 101 alternately arranged along the bending direction of the flexible display module 101. Providing the plurality of airbags 1021a arranged in a staggered manner can increase a thickness uniformity of the flexible display device 100.

Wherein, a thickness of the airbag 1021a ranges from 0.3 mm to 2 mm. Specifically, the thickness of the airbag 1021a may be 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, or 2 mm. It can be understood that, the thickness of the airbag 1021a can also be other values ranges from 0.3 mm to 2 mm. The thickness of the airbag 1021a can be adaptively designed according to a size, a thickness, and a weight of the flexible display module 101. Since the larger the thickness of the airbag 1021a, the better the support, the higher the second stiffness. Therefore, when the flexible display module 101 needs a higher-strength support in the flattened state, the thickness of the airbag 1021a should be increased.

Optionally, a quantity of airbags 1021a is one. The airbag 1021a is disposed at the center axis of the flexible display module 101. When the quantity of airbags 1021a is one, better supporting effect can be obtained by arranging the airbag 1021a at the center axis of the flexible display module 101. Disposing only one airbag 1021a can greatly simplify the structure of the flexible display device 100.

Optionally, a quantity of the airbag 1021a is two, and two airbags 1021a are disposed on both sides of the flexible display module 101. By arranging two airbags 1021a on both sides of the flexible display module 101, the flexible display module 101 can be most effectively supported with the simplest structure of the support module 102. It can be understood that the two airbags 1021*a* may be arranged on both sides of the end of the flexible display module 101 near the end as shown in FIG. 1 and FIG. 2. Further, two airbags 1021*a* can be symmetrically arranged on both sides of the flexible display module 101.

It can be noted that the embodiment of the present application is described by taking one airbag 1021*a* and two airbags 1021*a* as an example. In practical applications, the plurality of airbags 1021*a* may be disposed on the flexible display module 101, and the specific number of airbags 1021*a* may be adjusted according to the size of the flexible display device 100.

Optionally, the support module 102 further includes an air pump 1021*b*, an air valve 1021*c*, and an air conduit 1021*d*. The air pump 1021*b* is disposed in the flexible display module 101. The air conduit 1021*d* connects the air pump 1021*b* and the airbag 1021*a*, and the air valve 1021*c* is disposed between the air conduit 1021*d* and the airbag 1021*a* for controlling an inflow and an outflow of gas.

Since the flexible display device 100 needs to realize a function of curling, a flexibility of the flexible display device 100 is great. Therefore, a stiffness of the flexible display device 100 in the flat state cannot be guaranteed. By arranging the airbag 1021*a*, the flexibility of the flexible display module 101 is realized in a deflated state. When the flexible display module 101 needs to be stretched, an air pump 1021*b* is used to supply air, an air valve 1021*c* is opened, and an air conduit 1021*d* is connected, so that the airbag 1021*a* is filled with air, so as to drive the flexible display module 101 to restore the flatness. In addition, since the airbag 1021*a* is supplied with gas through the air pump 1021*b*, the airbag 1021*a* has a relatively large stiffness, which can support the flexible display module 101.

Optionally, the flexible display module 101 includes a flexible display panel 1011 and a driving circuit board 1012. The driving circuit board 1012 is disposed on a side of the flexible display panel 1011. The air pump 1021*b* is disposed on the driving circuit board 1012.

Specifically, the air pump 1021*b* has a solder fillet. The air pump 1021*b* is fixed on the driving circuit board 1012 by soldering with solder paste. In addition, an inflation and a deflation of the air pump 1021*b* are controlled by a circuit chip on the driving circuit board 1012, so the stiffness of the airbag 1021*a* can be intelligently controlled and can match a display function of the flexible display module 101.

Specifically, it is necessary to set a position of the air pump 1021*b* to print the solder paste stencil on the driving circuit board 1012 by using a screen-printing machine. Then, the air pump 1021*b* is accurately mounted on the solder paste using a placement machine. Finally, the solder paste is melted at high temperature, and after cooling the solder paste, the air pump 1021*b* and the driving circuit board 1012 are firmly soldered together.

A material of the solder paste may be one or a combination of tin (Sn), silver (Ag), copper (Cu), nickel (Ni), and gold (Au). The solder paste solders the air pump 1021*b* and the driving circuit board 1012 together, which can make the connection between the air pump 1021*b* and the driving circuit board 1012 tighter and not to fall off easily, thereby ensuring the reliability of the support module 102.

Optionally, please continue to refer to FIG. 1, the support module 102 further includes an adhesive layer 103. The adhesive layer 103 is used to connect the support module 102 and the flexible display module 101. The adhesive layer 103 may use Optically Clear Adhesive (OCA) optical adhesive, glass adhesive or other adhesive materials. The OCA optical adhesive has higher strength when making surface connections. Therefore, the OCA optical adhesive can ensure stability of the connection. In addition, laminating a product with the OCA optical adhesive can make the product surface flatter and avoid the problem of uneven thickness, so as to avoid the impact on the curling and unfolding of the flexible display device 100.

Optionally, please continue to refer to FIG. 1, the support module 102 further includes a support film 1022. The support film 1022 is disposed on the flexible display module 101. The adjustment member 1021 is disposed on the support film 1022. Specifically, the support film 1022 can be made of a metal material. The support film 1022 is made of a metal material, which can support the flexible display module 101 by utilizing properties of elasticity and certain strength of the metal material. The metal material may be any of silver, aluminum, nickel, chromium, molybdenum, copper, tungsten, or titanium.

Optionally, a thickness of the support film 1022 ranges from 0.02 mm to 0.5 mm. Specifically, the thickness of the support film 1022 may be 0.02 mm, 0.05 mm, 0.1 mm, 0.2 mm, 0.3 mm, 0.4 mm, or 0.5 mm. Setting the support film 1022 to an appropriate thickness can ensure the flatness of the screen and protect a back of the screen from being damaged by other parts, so as to improve the bending life of the flexible display module 101.

Figure 3:
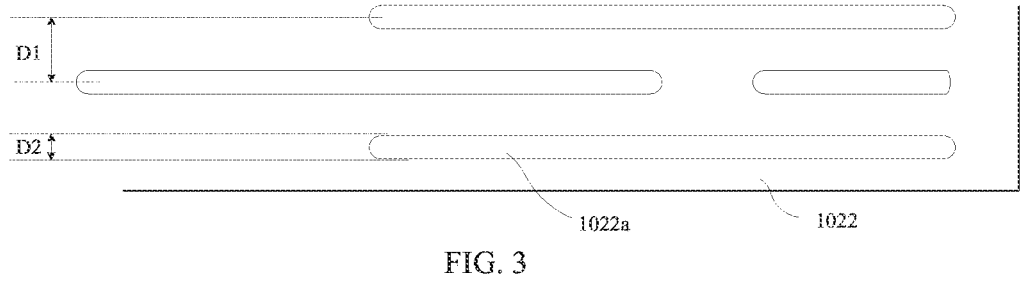
FIG. 3 is a partial structural schematic diagram of the support film in the flexible display device provided by the present application.

Optionally, please refer to FIG. 3, FIG. 3 is a partial structural schematic diagram of the support film in the flexible display device provided by the present application. A hollow pattern 1022*a* defined in the support film 1022. Since the support film 1022 is made of metal materials, in order to ensure the flatness of the support film 1022 and prevent a warping of the support film 1022, an elastic modulus of the support film 1022 can be reduced by etching and hollowing, so that the flexible display module 101 can be curled or folded according to the design.

Optionally, the hollow pattern 1022*a* is a plurality of strip-shaped through holes arranged at intervals. A spacing D1 of the strip-shaped through holes ranges from 0.2 mm to 2 mm. A width D2 of any one of the strip-shaped through holes ranges from 0.2 mm to 1 mm. Specifically, the spacing D1 of the strip-shaped through holes can be 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, or 2 mm. The width D2 of any one of the strip-shaped through holes can be 0.2 mm, 0.3 mm, 0.4 mm, 0.5 mm, 0.6 mm, 0.7 mm, 0.8 mm, 0.9 mm, or 1 mm. The spacing D1 and the width D2 between the strip-shaped through holes can jointly define a hollow area and a hollow degree of the hollow pattern 1022*a*. The support film 1022 needs to be designed with the hollow pattern 1022*a* with a suitable hollow degree. If the hollow degree is too large, the flexible display module 101 cannot be well-supported. If the hollow degree is too small, it cannot have good flexibility, thereby affecting the curling or folding of the flexible display module 101. Specifically, a size of the hollow pattern 1022*a* can be adaptively designed according to a size of the flexible display module 101 and the curling radius of the flexible display module 101, which is not specifically limited in this application.

Figure 4:
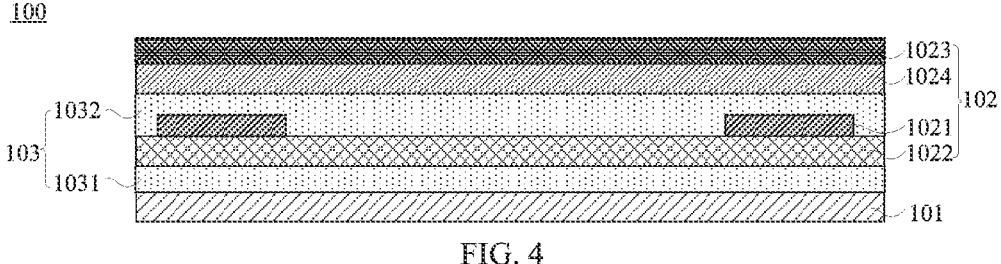
FIG. 4 is a cross-sectional structural schematic diagram of a flexible display device provided by the present application.
Figure 5:
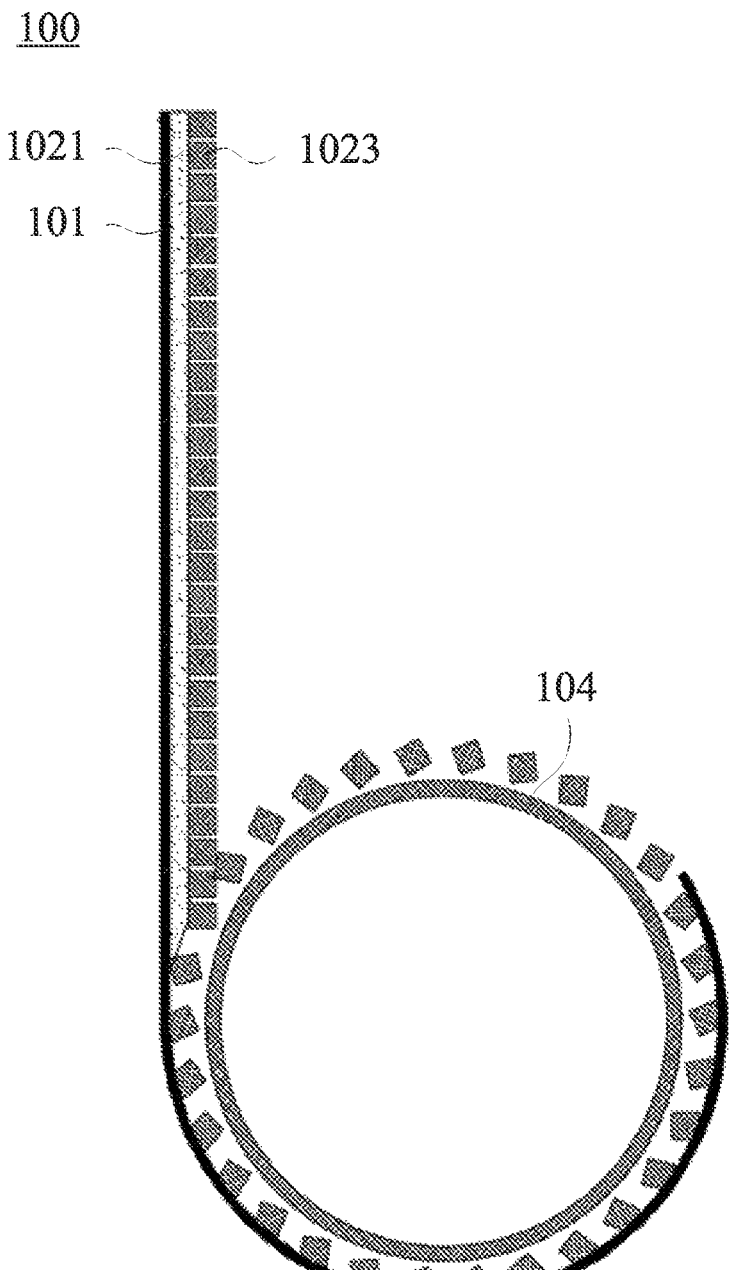
FIG. 5 is a curling structure schematic diagram of a flexible display device provided by the present application.

Optionally, please refer to FIG. 1, FIG. 4, and FIG. 5. FIG. 4 is a cross-sectional structural schematic diagram of a flexible display device provided by the present application. FIG. 5 is a curling structure schematic diagram of a flexible display device provided by the present application. The support module 102 further includes a hinge bearing film 1024 and a hinge 1023. The hinge bearing film 1024 is disposed on a side of the adjustment member 1021 away from the flexible display module 101. The hinge 1023 is disposed on a side of the hinge bearing film 1024 away from the flexible display module 101.

Wherein, the hinge bearing film 1024 is used for carrying the hinge 1023 and enables the hinge 1023 to be firmly assembled on the flexible display module 101. Wherein, a thickness of the hinge bearing film 1024 ranges from 0.1 mm to 1 mm. Specifically, the thickness of the hinge bearing film 1024 may be 0.1 mm, 0.2 mm, 0.3 mm, 0.4 mm, 0.5 mm, 0.6 mm, 0.7 mm, 0.8 mm, 0.9 mm, or 1 mm. The thickness of the hinge bearing film 1024 is too thin to stabilize the hinge 1023. If the thickness of the hinge bearing film 1024 is too thick, a lightness and thinness of the whole flexible display device 100 will be affected.

Wherein, the hinge 1023 is composed of a plurality of metal strips. The hinge 1023 is used to protect a flatness of the flexible display module 101 in a vertical bending direction, and at a same time, playing a role of protecting the flexible display module 101. In addition, the hinge 1023 is also used to limit a volume of the adjustment member 1021 to keep it within a set range, so as to prevent the adjustment member 1021 from being formed without limitation. A width of the metal strip in the hinge 1023 ranges from 5 mm to 20 mm. A thickness of the hinge 1023 ranges from 1 mm to 5 mm. A size and length of the hinge are adapted to a size of the flexible display module 101. An interval of metal strips in the hinge 1023 ranges from 0.2 mm to 1 mm.

Specifically, the width of the metal strip in the hinge 1023 can be 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, or 20 mm. If the width of the metal strip is too narrow, a strength of the hinge 1023 is too low, and the flexible display module 101 cannot be well-supported. If the width of the metal strip is too wide, when the flexible display module 101 is in the bent state, the hinge 1023 will cause the flexible display module 101 to form a polygon, which affects the flexible display effect.

Specifically, an interval of the metal strips of the hinge 1023 may be 0.2 mm, 0.3 mm, 0.4 mm, 0.5 mm, 0.6 mm, 0.7 mm, 0.8 mm, 0.9 mm, or 1 mm. If the interval of the metal strips of the hinge 1023 is too large, the flexible display module 101 cannot be well-supported. If the interval of the metal strips of the hinge 1023 is too small, the curling of the flexible display module 101 will be affected.

Wherein, a thickness of the hinge 1023 may be 1 mm, 1.5 mm, 2 mm, 2.5 mm, 3 mm, 3.5 mm, 4 mm, 4.5 mm, or 5 mm. The thickness of the hinge 1023 should be an appropriate value according to the size of the flexible display module 101, and it should be ensured that the hinge 1023 does not affect the lightness and thinness of the flexible display device 100 on the premise that the hinge 1023 has sufficient support and curling degree.

Wherein, the adhesive layer 103 may include a first adhesive layer 1031 and a second adhesive layer 1032. The first adhesive layer is used to connect the support film 1022 and the flexible display module 101. The second adhesive layer 1032 is used to connect the hinge bearing film 1023 and the adjustment member 1021. Materials used for the first adhesive layer 1031 and the second adhesive layer 1032 may be same or different, and thicknesses of the first adhesive layer 1031 and the second adhesive layer 1032 may also be same or different, which are not limited in this application.

Optionally, a unilateral motor can be used to drive the flexible display module 101 to curl or unfold. The motor can be connected with the driving circuit board of the flexible display module 101, and the driving circuit board can be used to drive the motor and the air pump to work synchronously, so that the flexible display module 101 can be in a better bent and flattened state.

Optionally, please continue to refer to FIG. 5, the flexible display device 100 further includes a rotating shaft 104. The rotating shaft 104 can be a hollow rotating shaft, and the rotating shaft 104 can be sleeved on the periphery of the flexible display device 100. The rotating shaft 104 can be connected with the motor to drive the flexible display module 101 to curl or unfold.

Figure 6:
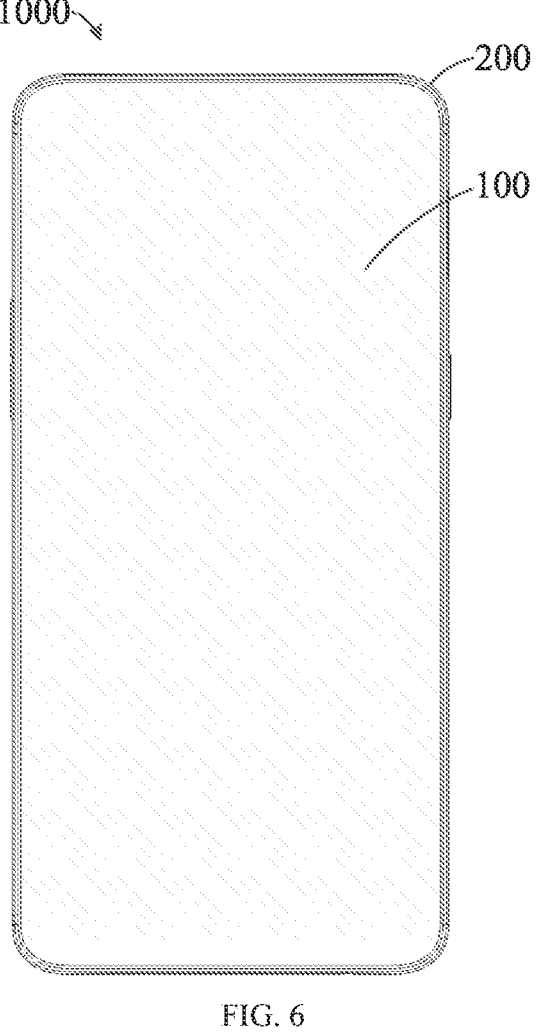
FIG. 6 is a structural schematic diagram of an electronic equipment provided by the present application.

Correspondingly, the present application also provides an electronic equipment. Please refer to FIG. 6, FIG. 6 is a schematic structural diagram of an electronic equipment provided by the present application. The electronic equipment 1000 includes the flexible display device 100 and the package structure 200. The flexible display device 100 is the flexible display device 100 described in any one of the above. The package structure 200 is disposed on the flexible display device 100.

The electronic equipment 1000 provided by the embodiments of the present application includes the flexible display device 100. The flexible display device 100 provided by the embodiments of the present application includes the flexible display module and the support module. The support module includes the adjustment member. The adjustment member enables the flexible display module to maintain the flatness of the flexible display module without any external force, and does not affect the curling of the flexible display module. When the flexible display device is in the bent state and flattened state, the adjustment member has two states with different stiffness. Therefore, the design of many complicated rotating mechanisms and motors can be omitted, thereby simplifying the structure, and reducing the cost of the flexible display device.

The flexible display device and the electronic equipment provided by the embodiments of the present application have been introduced in detail above. The principles and implementations of the present application are described herein using specific examples, and the descriptions of the above embodiments are only used to help understand the methods and core ideas of the present application; meanwhile, for those skilled in the art, according to the Thoughts, there will be changes in specific embodiments and application scopes. To sum up, the contents of this specification should not be construed as limitations on the present application.

What is claimed is:

1. A flexible display device, comprising:
   a flexible display module having a bent state and a flattened state;
   a rotating shaft; and
   a support module disposed below the flexible display module, and the support module comprising an adjustment member;
   wherein when the flexible display module is in the bent state, the adjustment member is to curl and the adjustment member has a first stiffness; when the flexible display module is in the flattened state, the adjustment member is to flatten, and the adjustment member has a second stiffness; and the first stiffness is less than the second stiffness;
   wherein the support module further comprises a hinge bearing film and a hinge, the hinge bearing film is disposed on a side of the adjustment member away from the flexible display module, and the hinge is disposed on a side of the hinge bearing film away from the flexible display module;

wherein the hinge is arranged between the flexible display module and the rotating shaft;

wherein the adjustment member is arranged between the flexible display module and the rotating shaft; and the hinge bearing film is in contact with a surface of the adjustment member away from the flexible display module.

2. The flexible display device according to claim 1, wherein the adjustment member is a solid-liquid conversion regulator or a gas regulator.

3. The flexible display device according to claim 2, wherein the solid-liquid conversion regulator comprises a containment structure and a solid-liquid conversion material, and the solid-liquid conversion material is accommodated in the containment structure; when the flexible display module is in the bent state, the solid-liquid conversion material is liquid, and when the flexible display module is in the flattened state, the solid-liquid conversion material is solid.

4. The flexible display device according to claim 2, wherein the gas regulator is an airbag, when the flexible display module is in the bent state, the airbag is in a shrinking state, and when the flexible display module is in the flattened state, the airbag is in an expanded state.

5. The flexible display device according to claim 4, wherein the airbag is strip-shaped, and the airbag is arranged along a bending direction of the flexible display module.

6. The flexible display device according to claim 5, wherein a quantity of the airbag is two, and two airbags are disposed on both sides of the flexible display module.

7. The flexible display device according to claim 4, wherein the flexible display device further comprises an air pump, an air valve, and an air conduit; the air conduit connects the air pump and the airbag; and the air valve is disposed between the air conduit and the airbag for controlling an inflow and an outflow of gas.

8. The flexible display device according to claim 7, wherein the flexible display module comprises a flexible display panel and a driving circuit board, the driving circuit board is disposed on a side of the flexible display panel, and the air pump is disposed on the driving circuit board.

9. The flexible display device according to claim 1, wherein the support module further comprises a support film, the support film is disposed on the flexible display module, and the adjustment member is disposed on the support film.

10. The flexible display device according to claim 9, wherein a hollow pattern is defined in the support film.

11. The flexible display device according to claim 10, wherein the hollow pattern is a plurality of strip-shaped through holes arranged at intervals, and a width of any one of the strip-shaped through holes ranges from 0.2 mm to 1 mm.

12. An electronic equipment, wherein, the electronic equipment comprises a flexible display device and a packaging structure, the flexible display device comprises:

a flexible display module having a bent state and a flattened state;

a rotating shaft; and

12 a support module disposed below the flexible display module, and the support module comprising an adjustment member;

wherein when the flexible display module is in a bent state, the adjustment member is to curl, and the adjustment member has a first stiffness; when the flexible display module is in the flattened state, the adjustment member is to flatten, and the adjustment member has a second stiffness; and the first stiffness is less than the second stiffness;

the packaging structure is disposed on the flexible display device;

wherein the support module further comprises a hinge bearing film and a hinge, the hinge bearing film is disposed on a side of the adjustment member away from the flexible display module, and the hinge is disposed on a side of the hinge bearing film away from the flexible display module;

wherein the hinge is arranged between the flexible display module and the rotating shaft;

wherein the adjustment member is arranged between the flexible display module and the rotating shaft; and the hinge bearing film is in contact with a surface of the adjustment member away from the flexible display module.

13. The electronic equipment according to claim 12, wherein the adjustment member is a solid-liquid conversion regulator or a gas regulator.

14. The electronic equipment according to claim 13, wherein the solid-liquid conversion regulator comprises a containment structure and a solid-liquid conversion material, and the solid-liquid conversion material is accommodated in the containment structure; when the flexible display module is in the bent state, the solid-liquid conversion material is liquid, and when the flexible display module is in the flattened state, the solid-liquid conversion material is solid.

15. The electronic equipment according to claim 13, wherein the gas regulator is an airbag, when the flexible display module is in the bent state, the airbag is in a shrinking state, and when the flexible display module is in the flattened state, the airbag is in an expanded state.

16. The electronic equipment according to claim 15, wherein the airbag is strip-shaped, and the airbag is arranged along a bending direction of the flexible display module.

17. The electronic equipment according to claim 16, wherein a quantity of the airbag is two, and two airbags are disposed on both sides of the flexible display module.

18. The electronic equipment according to claim 15, wherein the flexible display device further comprises an air pump, an air valve, and an air conduit, the air conduit connects to the air pump and the airbag; and the air valve is disposed between the air conduit and the airbag, for controlling an inflow and an outflow of gas.

19. The electronic equipment according to claim 18, wherein the flexible display module comprises a flexible display panel and a driving circuit board, the driving circuit board is disposed on a side of the flexible display panel, and the air pump is disposed on the driving circuit board.

* * * * *